United States Patent
Frischer (10) Patent No.: US 8,180,697 B2
(45) Date of Patent: May 15, 2012

(54) METHOD OF TRADING IN REAL ESTATE DERIVATIVES

(76) Inventor: Paul Frischer, Greenwich, CT (US)

( * ) Notice: Subject to any disclaimer, the term of this patent is extended or adjusted under 35 U.S.C. 154(b) by 0 days.

(21) Appl. No.: 13/110,551

(22) Filed: May 18, 2011

(65) Prior Publication Data

US 2011/0288981 A1 Nov. 24, 2011

Related U.S. Application Data

(62) Division of application No. 11/747,874, filed on May 11, 2007, now Pat. No. 7,974,904.

(60) Provisional application No. 60/887,451, filed on Jan. 31, 2007.

(51) Int. Cl.
*G06Q 40/00* (2006.01)

(52) U.S. Cl. ......................................... 705/36 R; 705/38

(58) Field of Classification Search ................ 705/36 R, 705/37, 35, 38, 26.1, 39, 1.1
See application file for complete search history.

(56) References Cited

U.S. PATENT DOCUMENTS

| | | | | |
|---|---|---|---|---|
| 6,618,707 B1 * | 9/2003 | Gary | ........................... | 705/36 R |
| 6,871,140 B1 | 3/2005 | Florance et al. | .............. | 701/207 |
| 6,901,384 B2 * | 5/2005 | Lynch et al. | ..................... | 705/38 |
| 7,076,452 B2 | 7/2006 | Florance et al. | ................. | 705/26 |
| 7,174,301 B2 | 2/2007 | Florance et al. | .................. | 705/1 |
| 7,246,093 B1 * | 7/2007 | Katz | ................. | 705/37 |
| 7,254,559 B2 | 8/2007 | Florance et al. | ................. | 705/51 |
| 7,487,114 B2 | 2/2009 | Florance et al. | ................. | 705/26 |
| 7,516,099 B2 * | 4/2009 | Schneider | ....................... | 705/38 |
| 7,640,204 B2 | 12/2009 | Florance et al. | ................. | 705/37 |
| 2004/0267657 A1 * | 12/2004 | Hecht | .............................. | 705/37 |
| 2005/0075961 A1 * | 4/2005 | McGill | ........................... | 705/35 |
| 2005/0216384 A1 * | 9/2005 | Partlow et al. | ................... | 705/35 |
| 2006/0100950 A1 * | 5/2006 | Hecht | .............................. | 705/37 |
| 2007/0061228 A1 * | 3/2007 | Hecht | .............................. | 705/35 |
| 2007/0156563 A1 * | 7/2007 | McGill | ....................... | 705/36 R |
| 2008/0046353 A1 * | 2/2008 | Poltorak et al. | ................. | 705/37 |
| 2010/0036765 A1 * | 2/2010 | Hecht | .............................. | 705/37 |

FOREIGN PATENT DOCUMENTS

| WO | 2005/024602 | 3/2005 |
|---|---|---|
| WO | WO 2005024602 A2 * | 3/2005 |

OTHER PUBLICATIONS

Anonymous "Eurex to launch bond indices" Dec. 6, 2002 Financial News (Daily).*
Geiger, Daniel "Service Firms Getting in on Derivatives" Dec 6, 2006 Real Estate Weekly, 53, 17, 1S(2).*

(Continued)

*Primary Examiner* — Kelly Campen

(57) ABSTRACT

A method of computing a real estate derivative index value includes: selecting asking rent data; selecting lease rent data; and combining the selected asking rent data and the selected lease rent data to form the index value. The method may further include further combining the combined data with a value representative of general market conditions; forming a composite index of data from plural markets; or computing the index at the end of a time period as:

$$\Delta FKI \text{ or as } \Delta RP+\Delta CPI+\Delta FKI.$$

The method may further include trading based on the index by deriving a trade value from the index value, and executing a trade based on the derived trade value. The method may be carried as instructions on a machine-readable medium and may be carried out using a computer for part or all of the method.

33 Claims, 2 Drawing Sheets

OTHER PUBLICATIONS

Leighton-Jones, P., "Eurex to Launch Bond Indices", Financial News, Dec. 6, 2002.

Geiger, D., "Service Firms Getting in on Derivatives", Real Estate Weekly, Dec. 6, 2006.

Lecomte et al., "Designing Property Futures Contracts and Options Based on NCREIF Property Indices" Journal of Real Estate Portfolio Management, vol. 12, No. 2, May 2006, pp. 119-153.

Chen, J., "CMBS: Moody's Approach to Rating Cross-Collateralized and Cross-Defaulted Loans", Moody's, Feb. 9, 2001.

"CME and Global Real Analytics Announce Licensing Agreement to Launch U.S. Commercial Real Estate Futures and Options", http://www.thefreelibrary.com/_/print/PrintArticle.aspx?id=150975400, Sep. 6, 2006.

Fisher, J., et al., "Development of an Effective Rent Index for U.S. Office Space (1982-1990)", Center for Real Estate Studies, Bloomington, IN, Mar. 19, 1992.

"GRA Commercial Real Estate Index (CREX) Methodology", Global Real Analytics LLC, Sep. 15, 2006.

Hendershott, P., et al., "Investor Rationality: An Analysis of NCREIF Commercial Property Data", Journal of Real Estate Research, vol. 27, No. 4, 2005, pp. 445-475.

Labuszewski, J.W., et al., "Introduction to CME U.S. Commercial Real Estate Futures and Options", Paper presented at the annual meeting of the American Real Estate Society, San Francisco, CA, Apr. 2007.

Otaka, M., et al., "Hedging and Pricing of Real Estate Securities Under Market Incompleteness", Quantitative Methods in Finance Conference, Cairns, Australia, 2002.

Pickard, J., "Property Swaps Soar", Financial Times, Sep. 20, 2006.

Plazzi, A., et al., "Expected Returns and the Expected Growth in Rents of Commercial Real Estate", Mar. 2006.

Sivitanides, P. et al., "Real Estate Market Fundamentals and Asset Pricing", The Journal of Portfolio Management, Special Issue 2003, pp. 45-53.

Wheaton, W. et al., "100 Years of Commercial Real Estate Prices in Manhattan", May 1, 2006.

\* cited by examiner

METHOD OF TRADING IN REAL ESTATE DERIVATIVES

CROSS REFERENCE TO RELATED APPLICATIONS

This application is a division of U.S. application Ser. No. 11/747,874, filed on May 11, 2007, now U.S. Pat. No. 7,974,904 and claims the benefit of U.S. Provisional Application No. 60/887,451, filed on Jan. 31, 2007. The entire disclosures of the above-mentioned earlier applications are hereby incorporated by reference herein.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

According to an exemplary embodiment of aspects of the invention referred to as the Rexx Real Estate Property Index, the Rexx Index calculates Total Return in commercial real estate for the US market based on lease transaction prices, asking rents, Effective Fed Funds, and CPI. The approach is to identify the change in valuation of commercial real estate from current macro and micro economic market conditions as they occur, in contrast to indeterminate average mean sales pairs or lagging appraisals and net income. When Rexx Index returns are benchmarked against indices prepared by Real Estate Investment Fiduciaries and transactional indices from independent research firms, both of which are lagging indicators, the Rexx Index provides a highly-correlated, leading reference point to current market conditions and change in valuation of commercial real estate in individual and broad markets. These results are a function of the data and the Δ Rent Model used in the construction of the Rexx Index which is statistically significant and can be used in all market conditions for all periods in question.

The Rexx Real Estate Property Index is based on a Δ Rent Model as explained below, and calculates Total Return, Capital Return and Δ Rent Return for 15 individual markets Atlanta, Boston, Chicago, Dallas, Denver, Houston, LA, NY Midtown, NY Midtown South, NY Downtown, Phoenix, San Francisco, Seattle, Miami, DC, and the broad market Rexx Composite Index. Of course, the selection of individual and composite market compositions is arbitrary and within the skill of the artisan in this field.

The Rexx Total Return, Rexx Capital Return, and Rexx Δ Rent Return for Individual Markets and the Rexx Composite Index can be published on any convenient schedule, for example, quarterly in February, May, August and November. If published according to the exemplary schedule, for example, then data collected for the period April, May, and June is published in August, for the quarter period ending June 30th.

The Δ Rent Model stands on data which is transparent and statistically significant and can be used in all market conditions for all periods in question. The benefit of the Δ Rent Model is apparent when compared to methods which are moderately successful in the valuation process on a "look back" basis, and are universally accepted to have extreme difficulty in the measurement of current market performance.

The Δ Rent Model uses the most fundamental and transparent information which landlords and tenants evaluate supply and demand in the commercial real estate market coupled with the impact of risk premium and cost adjustment to determine total return for the period in question. The Δ Rent Model does not rely on coefficients to offset unknown conditions and free radicals, rolling averages for lack of data, or manipulation of the data set over time. The Δ Rent Model does not rely on NOI, Cap Rate, and Stock Weighting which have proven ineffective in current market valuation.

The Δ Rent model determines total return in the commercial real estate market for all periods in questions based on the following assumptions:

1) Assets that produce risk free rates of return do not increase in value. Assets that produce returns above the risk free rate of return increase in value.
Assets that produce returns below the risk free rate of return decrease in value.
2) Real estate assets provide on-going return based on inflation tied to CPI and other rent escalation clauses.
3) Real estate revenue is dependent upon rent.

All data used in the calculation of the Rexx Index is available to the general public, either from public or private sources, some of which may require licenses from their owners. Real estate lease transaction and asking rent data is selected on the basis of specific filters, quality control, and market coverage provided by the leading global real estate brokerage and research firms. Interest rate data is compiled from the US Federal Reserve, and Inflation data is compiled from the US Bureau of Labor Statistics.

The Δ Rent Model for all periods in question is based on the equation:

$$\text{Total Market Return} = \Delta RP + \Delta CPI + \Delta FKI$$

Δ RP=Risk Premium (∞ Equilibrium−Δ FFR)
∞ Equilibrium=Average Total Return of Commercial real estate in equilibrium (end.point equilibrium)
Δ FFR=Effective Fed Funds Rate
Δ CPI=Urban Consumer CPI Inflation rate year over year.
Δ FKI=value change based on asking rent and lease transaction pricing of an individual market.
∞ Equilibrium is critical to understanding the Δ Rent Model.
∞ Equilibrium is the point when average total return is no longer changing and fixed, for all total return accumulated to ∞/∞, since at this point there are no additional returns to be considered.

In estimating ∞ Equilibrium, long term average total return in commercial real estate has consistently ranged between 8-12%.

In the Δ Rent Model, ∞ Equilibrium has been set=10.

The functionality and transparency of the Δ Rent model is the ability to measure the impact of macro economic factors in commercial real estate independent from individual market supply and demand conditions.

$$\text{Rexx Capital Return} = \Delta RP + \Delta CPI$$

Δ RP=value change from risk premium (∞ Equilibrium−Δ FFR)

Δ CPI=value change from inflation

With increases and decreases in the risk premium as measured by Δ RP, the value of commercial real estate increases and decreases in direct relationship for the period in question. With increases and decreases in the rate of inflation as measured by Δ CPI, the value of commercial real estate increases and decreases in direct relationship for the period in question.

Individual market performance is subject to micro economic conditions measured in the Δ Rent Model through asking rent and lease transaction pricing. The abundance of information related to these conditions is well documented, and the Δ Rent Model uses data of sufficient market coverage, reliability, and consistent application to determine current market return which includes unforeseen events and natural market trends.

Individual Market Δ FKI is calculated as follows:

$$\Delta FKI = (R1 - R0)/(R0) * 100$$

Δ FKI=value change in commercial real estate from individual market conditions.

R1=ending asking rent and lease transaction pricing for the individual market for the period in question.

R0=beginning asking rent and lease transaction pricing for the individual market for the period in question.

Rexx Index (IM) Total Return is calculated from the following equation for all individual markets, for all time periods in question, in all market conditions.

$$\text{Rexx}(IM) \text{Total Return} = \text{Rexx Capital} + \text{Rexx}(IM) \Delta \text{Rent}$$

$$\text{Rexx Capital} = \Delta RP + \Delta CPI$$

$$\text{Rexx}(IM) \Delta E \text{Rent} = \Delta FKI$$

For example, for Market Index period: 4 qtr 2005:

Rexx Chicago Total Return=Δ$RP$+Δ$CPI$+ChicagoΔ$FKI$=2.965

Rexx Capital=2.435Δ$RP$=1.505+Δ$CPI$=0.93

ChicagoΔ$FKI$=0.53

Rexx Dallas Total Return=Δ$RP$+Δ$CPI$+DallasΔ$FKI$=4.705

Rexx Capital=2.435Δ$RP$=1.505+Δ$CPI$=0.93

DallasΔ$FKI$=2.27

The Rexx Index Office Composite includes individual markets with a minimum of 25,000,000 sq ft of Class A office space, a minimum of 100 Class A office buildings, and sufficient research and advisory services to provide reliable reporting of market conditions for the period in question. Other criteria for selecting the individual markets forming the composite may be used. The individual market and composite index selection process does not limit the use of the Δ Rent Model. Other individual market indices and other composite indices corresponding to a different mix of markets or additional markets may be calculated as required.

Markets that can be calculated, under the above criteria, include, but are not limited to: Atlanta, Boston, Chicago, Dallas, Denver, Houston, LA, NY Midtown, NY Midtown South, NY Downtown, Phoenix, San Francisco, Seattle, Miami, DC.

All Rexx Composite Indices are equal weighted by individual market. The benefit of the Rexx Composite Index weighting allows for individual market comparison to the overall US Market performance, and the ability to measure performance based on individual portfolio holdings per market.

The Rexx Δ Rent calculation provides the measure for the supply and demand of all individual markets in the Rexx Δ Rent Composite. Which markets are included in each calculation can be varied, as desired by the index manager. The Rexx Δ Rent Calculation provides the measurement of supply and demand for all individual markets, without macro economic factors, and provides the basis to determine whether an individual market has performed above or below the average benchmark in the US market, and the basis for individual market to market comparison.

Rexx Composite Total Return=all individual market Total Returns/number of markets included In the exemplary embodiment, the number of markets included=15.

Trades based on the Rexx index, its components and its composites can be executed using any suitable mechanism. For example, options, futures, swaps and derivatives may all be traded in any suitable market on any suitable exchange. Prediction markets and exchanges, and spread-betting markets and exchanges, are two suitable market/exchange arrangements. These types of trades, markets and exchanges are briefly defined below.

| Definitions of Trade Types | |
|---|---|
| Term | Definition |
| option | The right, but not the obligation, to buy (for a call option) or sell (for a put option) a specific amount of a given stock, commodity, currency, index, or debt, at a specified price (the strike price) during a specified period of time. For stock options, the amount is usually 100 shares. Each option has a buyer, called the holder, and a seller, known as the writer. If the option contract is exercised, the writer is responsible for fulfilling the terms of the contract by delivering the shares to the appropriate party. In the case of a security that cannot be delivered such as an index, the contract is settled in cash. For the holder, the potential loss is limited to the price paid to acquire the option. When an option is not exercised, it expires. No shares change hands and the money spent to purchase the option is lost. For the buyer, the upside is unlimited. Options, like stocks, are therefore said to have an asymmetrical payoff pattern. For the writer, the potential loss is unlimited unless the contract is covered, meaning that the writer already owns the security underlying the option. Options are most frequently held as either leverage or protection. As leverage, options allow the holder to control equity in a limited capacity for a fraction of what the shares would cost. The difference can be invested elsewhere until the option is exercised. As protection, options can guard against price fluctuations in the near term because they provide the right to acquire the underlying stock at a fixed price for a limited time. Risk is limited to the option premium (except when writing options for a security that is not already owned). However, the costs of trading options (including both commissions and the bid/ask spread) is higher on a percentage basis than trading the underlying stock. In addition, options are very complex and require a great deal of observation and maintenance. This type of trade is also called option contract. |
| futures | A standardized, transferable, exchange-traded contract that requires delivery of a commodity, bond, currency, or stock index, at a specified price, on a specified future date. Unlike options, futures convey an obligation to buy. The risk to the holder is unlimited, and because the payoff pattern is symmetrical, the risk to the seller is unlimited as well. Dollars lost and gained by each party on a futures contract are equal and opposite. In other words, futures trading is a zero-sum game. Futures contracts are forward contracts, meaning they represent a pledge to make a certain transaction at a future date. The exchange of assets occurs on the date specified in the contract. Futures are distinguished from generic forward contracts in that they contain standardized terms, |

Definitions of Trade Types

| Term | Definition |
|---|---|
| | trade on a formal exchange, are regulated by overseeing agencies, and are guaranteed by clearinghouses. Also, in order to insure that payment will occur, futures have a margin requirement that must be settled daily. Finally, by making an offsetting trade, taking delivery of goods, or arranging for an exchange of goods, futures contracts can be closed. Hedgers often trade futures for the purpose of keeping price risk in check. This type of trade is also called futures contract. |
| swap | An exchange of streams of payments over time according to specified terms. The most common type is an interest rate swap, in which one party agrees to pay a fixed interest rate in return for receiving an adjustable rate from another party. |
| derivative | A financial instrument whose characteristics and value depend upon the characteristics and value of an underlier, typically a commodity, bond, equity or currency. Examples of derivatives include futures and options. Advanced investors sometimes purchase or sell derivatives to manage the risk associated with the underlying security, to protect against fluctuations in value, or to profit from periods of inactivity or decline. These techniques can be quite complicated and quite risky. |

Definitions of Market and Exchange Types

| Term | Definition |
|---|---|
| field | A field is a structured space of power and resources with its own forms of competition and reward. Markets are an important part of fields, but fields are much more than markets: They are also made up of agents and organizations and the relations among them, of networks and supply chains, of different kinds and quantities of power and resources that are distributed in certain ways, of specific practices and forms of competition, and so on. Each field has a distinctive dynamic that has evolved over time. The logic of the field defines the conditions under which agents and organizations can participate in the field and flourish or falter within it - that is, the conditions under which they can play the game. |
| market | A market is defined as a place where buyers and sellers get together and set prices and quantities. |
| exchange | An exchange is an organized market with transactions concentrated in a physical facility with participants entering two-sided quotations (bid and ask) on a continuous basis. |
| prediction exchange | An exchange that organizes prediction markets. Synonyms: event-driven futures exchange - (U.S.A.); event futures exchange - (U.S.A.); betting exchange - (U.K., Ireland, Australia); person-to-person betting exchange; peer-to-peer betting exchange; P2P betting exchange. Originally, prediction exchanges used real money. However, some play-money prediction exchanges have shown some form of accuracy. |
| betting exchange | (U.K.) Betting exchanges exist to match people who want to bet on a future outcome at a given price with others who are willing to offer that price. The person who bets on the event happening at a given price is the backer. The person who offers the price is known as the layer, and is essentially acting in the same way as a bookmaker. The advantage of this form of betting for the bettor is that, by allowing anyone with access to a betting exchange to offer or lay odds, it serves to reduce margins in the odds compared to the best odds on offer with traditional bookmakers. Exchanges allow clients to act as a bettor (backer) or bookmaker (layer) at will, and indeed to back and lay the same event at different times during the course of the market. The way in which this operates is that the major betting exchanges present clients with the three best odds and stakes which other members of the exchange are offering or asking for. For example, for England to beat Brazil at football the best odds on offer might be 4 to 1, to a maximum stake of £80, 3.5 to 1 to a further stake of £100 and 3 to 1 to a further stake of £500. This means that potential backers can stake up to a maximum of £80 on England to beat Brazil at odds of 4 to 1, a further £100 at 3.5 to 1 and a further £500 at 3 to 1. These odds, and the staking levels available, may have been offered by one or more other clients who believe that the true odds were longer than they offered. An alternative option available to potential backers is to enter the odds at which they would be willing to place a bet, together with the stake they are willing to wager at that odds level. This request (say £50 at 4 to 1) will then be shown on the request side of the exchange, and may be accommodated by a layer at any time until the event is |

| Term | Definition |
| --- | --- |
| | over. The margin between the best odds on offer and the best odds sought tends to narrow as more clients offer and lay bets, so that in popular markets the real margin against the bettor (or layer) tends towards the commission levied (normally on winning bets) by the exchange. This commission varies from about 2 percent to 5 percent. |
| spread-betting exchange | An exchange that matches spread bettors. The nature of spread betting is that the more punters are right, the more they win, and vice versa. A spread bet asks punters to estimate whether a pre-determined outcome will be above or below a given range. The potential gain or loss depends on how far above or below that range the number will be. |
| prediction markets | Prediction markets are designed specifically to forecast events. - Some are markets designed specifically for information aggregation and revelation. Prediction markets are usually designed and conducted for the purpose of aggregating information so that market prices forecast future events. These markets differ from typical, naturally occurring markets in their primary role as a forecasting tool instead of a resource allocation mechanism. Participants trade in contracts whose payoff depends on unknown future events. Prediction markets - also called idea futures markets or information markets - are designed to aggregate information and produce predictions about future events: for example, a political candidate's re-election, or a box-office take, or the probability that the Federal Reserve will increase interest rates at its next meeting. To elicit such predictions, contract payoffs are tied to unknown future events. For example, a contract might pay $100 if George Bush is re-elected in 2004, or nothing if he is not. Thus, until the outcome is decided, the trading price reflects the traders' collective consensus about the expected value of the contract, which in this case is exactly proportional to the probability of Bush's re-election. |
| Information markets | Prediction markets specifically created to aggregate information. Such markets usually estimate a probability distribution over the values of certain variables, via bets on those values. A market designed from the outset for information gathering and forecasting is called an information market. Information markets can be used to elicit a collective estimate of the expected value or probability of a random variable, reflecting information dispersed across an entire population of traders. The market prediction is not usually an average or median of individual opinions, but is a complex summarization reflecting the game-theoretic interplay of traders as they obtain and leverage information, and as they react to the actions of others obtaining and leveraging their own information, etc. In the best case scenario, the market price reflects a forecast that is a perfect Bayesian integration of all the information spread across all of the traders, properly accounting even for redundancy. This is the equilibrium scenario called rational expectations in the economics literature, and is the assumption underlying the strong form of the efficient markets hypothesis in finance. |

Several different suitable market structures can be used, including conventional continuous double auction markets, combinatorial information markets and double pari-mutuel markets.

Combinatorial information markets use market scoring rules as combinatorial information market makers.

Information markets are markets created to aggregate information. Such markets usually estimate a probability distribution over the values of certain variables, via bets on those values. Combinatorial information markets would aggregate information on the entire joint probability distribution over many variables, by allowing bets on all variable value combinations. To achieve this, we want to overcome the thin market and irrational participation problems that plague standard information markets. Scoring rules avoid these problems, but instead suffer from opinion pooling problems in the thick market case. Market scoring rules avoid all these problems, by becoming automated market makers in the thick market case and simple scoring rules in the thin market case. Logarithmic versions have cost and modularity advantages.

While a simple information market lets one trade on the probability of each value of a single variable, a combinatorial information market lets one trade on any combination of a set of variables, including any conditional or joint probability.

A dynamic pari-mutuel market (DPM) acts as hybrid between a pari-mutuel market and a continuous double auction (CDA), inheriting some of the advantages of both. A DPM offers infinite buy-in liquidity and zero risk for the market institution; like a CDA, a DPM can continuously react to new information, dynamically incorporate information into prices, and allow traders to lock in gains or limit losses by selling prior to event resolution. The trader interface can be designed to mimic the familiar double auction format with bid-ask queues, though with an addition variable called the payoff per share. The DPM price function can be viewed as an automated market maker always offering to sell at some price, and moving the price appropriately according to demand. Since the mechanism is pari-mutuel (i.e., redistributive), it is guaranteed to pay out exactly the amount of money taken in.

All the necessary computations to implement the index, its derivatives, trades, and markets and exchanges can be carried out by computer. Embodiments using computers may incorporate systems as now described.

Various aspects of some embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to perform various trading-related tasks according to various embodiments of the invention. Further, one or more portions of a real estate derivatives trading system may be located on a single computer or may be distributed among a plurality of computers attached by a communications network.

A general-purpose computer system according to one embodiment of the invention is configured to perform any of the described functions related to trading real estate derivatives including but not limited to computing values of an index to be traded or components thereof, evaluating a portfolio and changes thereto and communicating trade information between investors and traders. It should be appreciated that the system may perform other functions, including network communication, and the invention is not limited to having any particular function or set of functions.

Figure 1:
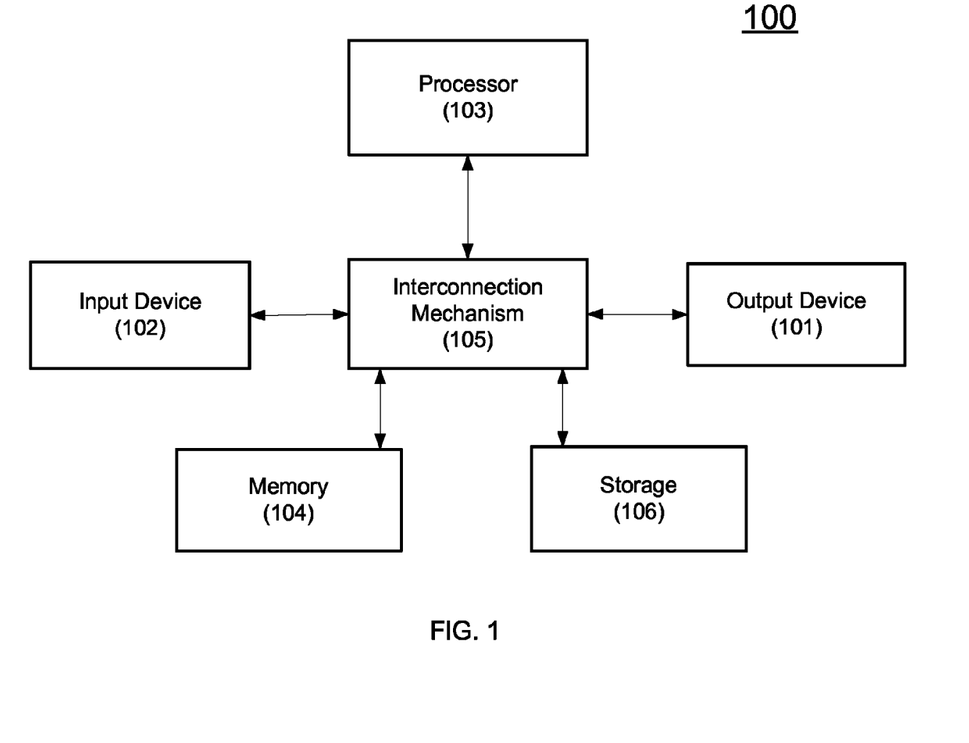
FIG. 1 is a computer system in accordance with an embodiment of the present invention.

For example. various aspects of the invention may be implemented as specialized software executing in a general-purpose computer system 100 such as that shown in FIG. 1. The computer system 100 may include a processor 103 connected to one or more memory devices 104, such as a disk drive, memory, or other device for storing data. Memory 104 is typically used for storing programs and data during operation of the computer system 100. Components of computer system 100 may be coupled by an interconnection mechanism 105, which may include one or more busses (e.g., between components that are integrated within a same machine) and/or a network (e.g., between components that reside on separate discrete machines). The interconnection mechanism 105 enables communications (e.g., data, instructions) to be exchanged between system components of system 100.

Computer system 100 also includes one or more input devices 102, for example, a keyboard, mouse, trackball, microphone, touch screen, and one or more output devices 101, for example, a printing device, display screen, speaker. In addition, computer system 100 may contain one or more interfaces (not shown) that connect computer system 100 to a communication network (in addition or as an alternative to the interconnection mechanism 105.)

Figure 2:
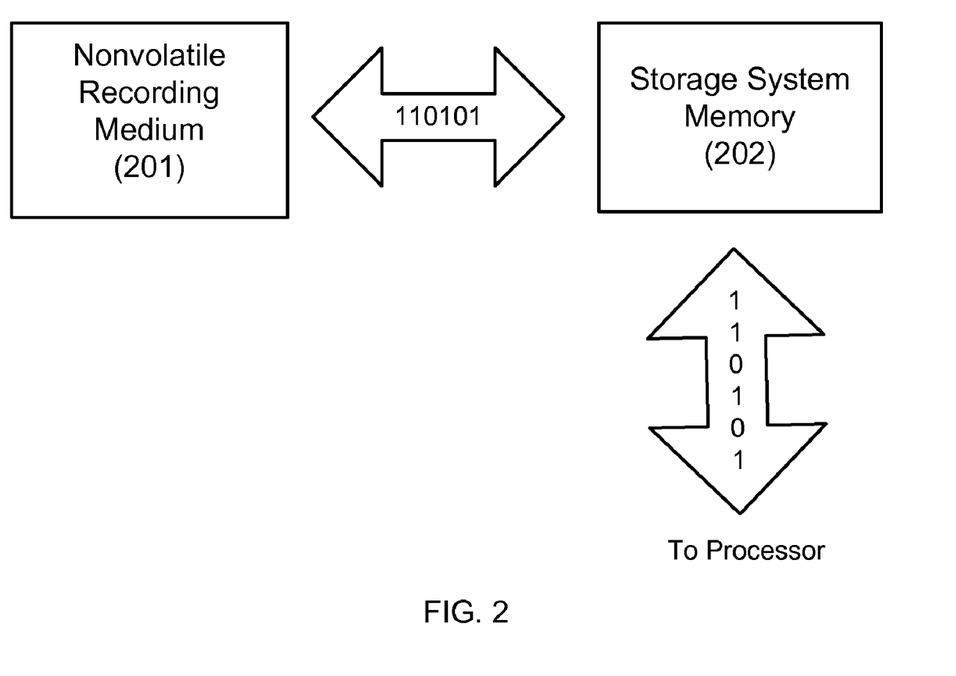
FIG. 2 is a storage system in accordance with an embodiment of the present invention.

The storage system 106, shown in greater detail in FIG. 2, typically includes a computer readable and writeable nonvolatile recording medium 201 in which signals are stored that define a program to be executed by the processor or information stored on or in the medium 201 to be processed by the program. The medium may, for example, be a disk or flash memory. Typically, in operation, the processor causes data to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM). It may be located in storage system 106, as shown, or in memory system 104, not shown. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is not limited to a particular memory system 104 or storage system 106.

The computer system may include specially programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components that that shown in FIG. 1.

Computer system 100 may be a general-purpose computer system that is programmable using a high-level computer programming language. Computer system 100 may be also implemented using specially programmed, special purpose hardware. In computer system 100, processor 103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable. intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of trading a real estate derivative index, the method comprising:
generating, by a processor, a real estate derivative index value, the real estate derivative index value generated according to:

$$\Delta FKI=(R1-R0)/(R0)*100, \text{ wherein,}$$

$\Delta$ A FKI is the real estate derivative index value corresponding to a value change in commercial real estate in an individual market based on at least one of asking rent data and lease rent data including ending market pricing data and beginning market pricing data,
R1 is the ending market pricing data for a predetermined period,
R0 is the beginning market pricing data for the predetermined period, and
wherein the asking rent data and lease rent data are based on an evaluation of supply and demand pricing in the individual market; and
settling a trade of a financial instrument based on the real estate derivative index value.

2. The method of claim 1, wherein the trading instrument is a forward contract.

3. The method of claim 1, wherein the financial instrument is a futures contract.

4. The method of claim 1, wherein the financial instrument is an option contract.

5. The method of claim 1, wherein the trading instrument is a swap contract.

6. The method of claim 1, further comprising the steps of:
receiving a risk premium ($\Delta$ RP);
receiving an inflation rate ($\Delta$ CPI); and
generating a total market return based on the real estate derivative index value according to:

$$\text{Total Market Return}=\Delta RP+\Delta CPI+\Delta FKI; \text{ and}$$

settling a trade of a financial instrument based on the total return.

7. The method of claim 6, wherein the risk premium is based on a change in a risk free rate.

8. The method of claim 7, wherein the risk free rate is an effective federal funds rate.

9. The method of claim 1, further comprising the steps of:
generating a total return for a plurality of individual markets by:
performing a weighted sum of the real estate derivative index value for each individual market of the plurality of individual markets, and
dividing the weighted sum by the number of the plurality of individual markets; and
settling a trade of a financial instrument based on the total return.

10. The method of claim 1, wherein the real estate derivative index value is a composite formed of data from a plurality of individual markets.

11. The method of claim 1, further comprising:
storing results from a plurality of trades settled by the settling.

12. A non-transitory computer-readable medium storing instructions for trading a real estate derivative index, which when executed by a computer cause the computer to perform:
receiving a real estate derivative index value, the real estate derivative index value generated according to:

$$\Delta FKI=(R1-R0)/(R0)*100, \text{ wherein,}$$

$\Delta$ FKI is the real estate derivative index value corresponding to a value change in commercial real estate in an individual market based on at least one of asking rent data and lease rent data including ending market pricing data and beginning market pricing data,
R1 is the ending market pricing data for a predetermined period,
R0 is the beginning market pricing data for the predetermined period, and
wherein the asking rent data and lease rent data are based on an evaluation of supply and demand pricing in the individual market; and
settling a trade of a financial instrument based on the real estate derivative index value.

13. The non-transitory computer-readable medium according to claim 12, wherein the trading instrument is a forward contract.

14. The non-transitory computer-readable medium according to claim 12, wherein the financial instrument is a futures contract.

15. The non-transitory computer-readable medium according to claim 12, wherein the financial instrument is an option contract.

16. The non-transitory computer-readable medium according to claim 12, wherein the trading instrument is a swap contract.

17. The non-transitory computer-readable medium according to claim 12, further comprising the steps of:
receiving a risk premium ($\Delta$ RP);
receiving an inflation rate ($\Delta$ CPI); and
generating a total market return based on the real estate derivative index value according to:

$$\text{Total Market Return}=\Delta RP+\Delta CPI+\Delta FKI; \text{ and}$$

settling a trade of a financial instrument based on the total return.

18. The non-transitory computer-readable medium according to claim 17, wherein the risk premium is based on a change in a risk free rate.

19. The non-transitory computer-readable medium according to claim 18, wherein the risk free rate is an effective federal funds rate.

20. The non-transitory computer-readable medium according to claim 12, further comprising the steps of:
generating a total return for a plurality of individual markets by:
performing a weighted sum of the real estate derivative index value for each individual market of the plurality of individual markets, and
dividing the weighted sum by the number of the plurality of individual markets; and
settling a trade of a financial instrument based on the total return.

21. The non-transitory computer-readable medium according to claim 12, wherein the real estate derivative index value is a composite formed of data from a plurality of individual markets.

22. The non-transitory computer-readable medium according to claim 12, further comprising:
storing results from a plurality of trades settled by said settling.

23. A system for trading a real estate derivative index, comprising:
a processor operable to:
receive a real estate derivative index value, the real estate derivative index value generated according to:

$$\Delta FKI = (R1-R0)/(R0)*100, \text{wherein,}$$

$\Delta$ FKI is the real estate derivative index value corresponding to a value change in commercial real estate in an individual market based on at least one of asking rent data and lease rent data including ending market pricing data and beginning market pricing data, R1 is the ending market pricing data for a predetermined period, R0 is the beginning market pricing data for the predetermined period, and wherein the asking rent data and lease rent data are based on an evaluation of supply and demand pricing in the individual market; and settle a trade of a financial instrument based on the real estate derivative index value.

24. The system according to claim 23, wherein the trading instrument is a forward contract.

25. The system according to claim 23, wherein the financial instrument is a futures contract.

26. The system according to claim 23, wherein the financial instrument an option contract.

27. The system according to claim 23, wherein the trading instrument is a swap contract.

28. The system according to claim 23, the processor further operable to:
receive a risk premium ($\Delta$ RP);
receive an inflation rate ($\Delta$ CPI); and
generate a total market return based on the real estate derivative index value according to:

$$\text{Total Market Return} = \Delta RP + \Delta CPI + \Delta FKI$$

settle a trade of a financial instrument based on the total return.

29. The method of claim 28, wherein the risk premium is based on a change in a risk free rate.

30. The method of claim 29, wherein the risk free rate is an effective federal funds rate.

31. The system according to claim 23, wherein the processor is further operable to:
generate a total return for a plurality of individual markets by:
performing a weighted sum of the real estate derivative index value for each individual market of the plurality of individual markets, and
dividing the weighted sum by the number of the plurality of individual markets; and
settle a trade of a financial instrument based on the total return.

32. The system according to claim 23, wherein the real estate derivative index value is a composite formed of data from a plurality of individual markets.

33. The system according to claim 23, further comprising:
a database operable to store results from a plurality of settled trades.

\* \* \* \* \*